(12) United States Patent
Itoh et al.

(10) Patent No.: US 6,330,611 B1
(45) Date of Patent: *Dec. 11, 2001

(54) CLIENT PERIPHERAL DEVICE-BASED NETWORK RESOURCE MANAGEMENT METHOD AND SYSTEM

(75) Inventors: Hideki Itoh, Kawasaki; Akeo Maruyama, Tokyo, both of (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/025,461

(22) Filed: Feb. 18, 1998

(30) Foreign Application Priority Data

Feb. 18, 1997 (JP) ................................... 9-034079

(51) Int. Cl.$^7$ ....................................... G06F 15/16
(52) U.S. Cl. .................... 709/229; 709/201; 709/203; 709/217; 709/219; 709/227; 709/228; 710/8; 358/1.1
(58) Field of Search ................................ 709/200–203, 709/204–206, 217–229; 707/10; 710/8, 10, 15–19; 358/1.1, 1.13–1, 16, 1.18

(56) References Cited

U.S. PATENT DOCUMENTS

| | | | | |
|---|---|---|---|---|
| 5,325,527 | * | 6/1994 | Cwikowski et al. | 709/222 |
| 5,537,626 | * | 7/1996 | Kraslavsky et al. | 709/228 |
| 5,696,899 | * | 12/1997 | Kalwitz | 709/228 |
| 5,768,516 | * | 6/1998 | Sugishima | 709/217 |
| 5,796,952 | * | 8/1998 | Davis et al. | 709/224 |
| 5,848,261 | * | 12/1998 | Farry et al. | 358/1.13 |
| 5,862,404 | * | 1/1999 | Onaga | 709/223 |
| 5,905,783 | * | 5/1999 | Tonegawa | 358/400 |
| 5,905,865 | * | 5/1999 | Palmer et al. | 709/217 |
| 5,999,707 | * | 12/1999 | Taniguchi et al. | 709/224 |
| 6,025,925 | * | 2/2000 | Davidson, Jr. et al. | 358/1.15 |
| 6,097,882 | * | 8/2000 | Mogul | 709/201 |

* cited by examiner

*Primary Examiner*—Bharat Barot
(74) *Attorney, Agent, or Firm*—Knoble & Yoshida, LLC

(57) ABSTRACT

A peripheral device on a network has a client function to retrieve data and or to update data in another network resource. The peripheral device also has its own device dependent functions such as printing, copying, faxing and scanning. The peripheral device outputs data retrieved from another network resource and or inputs new data for updating the data existing in another network resource. The retrieving and updating functions are performed by a client control unit of the peripheral device.

25 Claims, 18 Drawing Sheets

FIG. 3

| PRNT | CURL | SURL | TRM |

INF (pointing to SURL)

| SERVER INFO. | PERIPHERAL INFO. | PRINT STATUS | RESPONSE DATA |
|---|---|---|---|
| SURL 1 | TRM1 | STAT 1, DONE | RES1 |
| SURL 2 | TRM2 | STAT 2, WAITING | — |
| ⋮ | ⋮ | ⋮ | ⋮ |
| SURL N | TRM N | STAT N | RES N |

FIG. 11

| SERVER INFO. | CLIENT INFO. | TERMINAL INFO. | UPDATE | SCHEDULE REPORT (TIME) | RESPONSE DATA |
|---|---|---|---|---|---|
| SURL | CURL 1 | TRM 1 | YES | YES(10:00 AM) | RES 1 |
| SURL 2 | CURL 2 | TRM 2 | NO | NO | RES 2 |
| ... | ... | ... | ... | ... | ... |
| SURL N | CURL N | TRM N | | | RES N |

| CLSS | SURL | DT |
|---|---|---|

FIG. 19

| DATA TYPE | SERVER INFO | SCHEDULE REPORT (TIME) | COLLECTION DATA |
|---|---|---|---|
| CMR | SURL1 | EVERY HOUR | CMDT |
| DTC | SURL1 | EVERY 3 HOURS | CMDT |

CLIENT PERIPHERAL DEVICE-BASED NETWORK RESOURCE MANAGEMENT METHOD AND SYSTEM

FIELD OF THE INVENTION

The current invention is generally related to a method of and a system for communicating among a family of devices according to a predetermined protocol and is more particularly related to a method of and a system for efficiently utilizing a resource such as a printer on a network based upon a communication protocol such as Transmission Control Protocol (TCP) and Internet Protocol (IP) without a specific device dependent interface and human intervention.

BACKGROUND OF THE INVENTION

In computer networks such as a local area network (LAN), internet and intranet, a communication protocol includes Transmission Control Protocol (TCP) and Internet Protocol (IP). A communication network generally includes resources or peripheral devices such a printer and a facsimile machine, and some of these peripherals have server software so as to function as a server in the network. However, since these peripherals are not necessarily located within the same network environment and often have device dependent instructions, if a terminal on the network accesses one of the remote peripherals, the terminal must access the resource according to a common access method. One such a common access method includes a browser in Internet.

One prior attempt uses a terminal unit to access a resource on a network without a browser. A terminal unit accesses peripheral devices based upon a Uniform Resource Locator (URL) and provides data with the peripheral device. If the peripheral device is a printer, the printer functions a server while the terminal functions as a client. In other words, the terminal provides the printer with data for printing the data. On the other hand, if the terminal does not have the data to be printed, the terminal must establish the data access in order to print the data. This prior art requires an operator of the terminal to manually and independently access the necessary resources on a network.

Another prior attempt considers a possibility of having a server function within a peripheral device to enable Web printing. In other words, a terminal accesses a printer on a network for remote printing. In order to accomplish Web printing among diverse print drivers, existing device drivers are modified for a printer to be used and sent to the printer via network along with the data. In this scheme, a terminal operator simply selects a desirable printer from a list of printers that are connected to the network, and an existing driver is modified according to the selected device.

In the above described prior attempts, a peripheral device functions as a server. Consequently, if a client such as a terminal directly utilizes a resource on a network and if the resource is a peripheral device which runs as a server on the same network, the client must provide the peripheral device with necessary data. This requirement prevents a first resource such as a printer from using an additional resource to provide data on the network. The above described Web printing enhances its flexibility and usefulness if a terminal unit can easily specify multiple resources including a Web printer and a Web document.

SUMMARY OF THE INVENTION

In order to solve the above and other problems, according to a first aspect of the current invention, a method of using a resource on a network, a first resource, a second resource and a third resource being connected to the network, the second resource being a peripheral device, includes the steps of: a) sending a first command from the first resource to the second resource for accomplishing a predetermined task which requires data from the third resource; b) generating a second command at the second resource in response to the first command and sending the second command to the third resource for requesting the data; c) receiving the data at the second resource from the third resource; d) generating a third command at the second resource based upon the data for outputting the data; and e) outputting the data from the second resource.

According to a second aspect of the invention, a method of using a peripheral device on a network, includes the steps of: a) receiving a data request command; b) generating a specific request command based upon the data request command; c) broadcasting the specific request command to the network; d) receiving data requested in the step h); and e) performing a predetermined task based upon the data.

According to a third aspect of the invention, a method of using a peripheral device on a network, including the steps of: a) generating a data set in response to a predetermined device specific task; b) storing the data set; and c) broadcasting the data set to network on a predetermined periodic basis.

According to a fourth aspect of the invention, a system for using a resource on a network, includes: a first resource on the network for sending a first command for accomplishing a predetermined task which requires additional data; a second resource on the network for generating a second command requesting the additional data in response to the first command and for sending the second command; and a third resource on the network for sending the additional data to the second resource in response to the second command, wherein the second resource generates a third command upon receiving the additional data for outputting the additional data according to the first command and the second resource outputs the additional data according to the third command.

According to a fifth aspect of the invention, a system for using a resource on a network, includes: a terminal unit on the network for broadcasting a data request; a client peripheral device on the network for performing a predetermined task and for generating a specific request command based upon the data request command; and a server unit on the network for sending response data to the client peripheral device in response to the specific request command, wherein the client performs the predetermined task on the response data.

According to a sixth aspect of the invention, a system for using a resource on a network, including: a first resource on the network for generating a data set in response to a predetermined device specific task, for storing the data set, and for broadcasting the data set to network on a predetermined periodic basis; and a second resource on the network for receiving the data set.

BRIEF DESCRIPTION OF THE DRAWINGS

FIG. 3 illustrates one exemplary command for Web printing in one preferred embodiment of the client peripheral device-based network resource management system according to the current invention.

FIG. 4 is one exemplary content of a memory unit in a peripheral device of one preferred embodiment according to the current invention.

FIG. 11 is one exemplary content of a memory unit in a peripheral device of the second preferred embodiment according to the current invention.

FIG. 18 illustrates an exemplary command for updating data in a network resource in the third preferred embodiment of the client peripheral device-based network resource management system according to the current invention.

FIG. 19 is one exemplary content of a memory unit in a peripheral device of the third preferred embodiment according to the current invention.

DETAILED DESCRIPTION OF THE PREFERRED EMBODIMENT(S)

Figure 1:
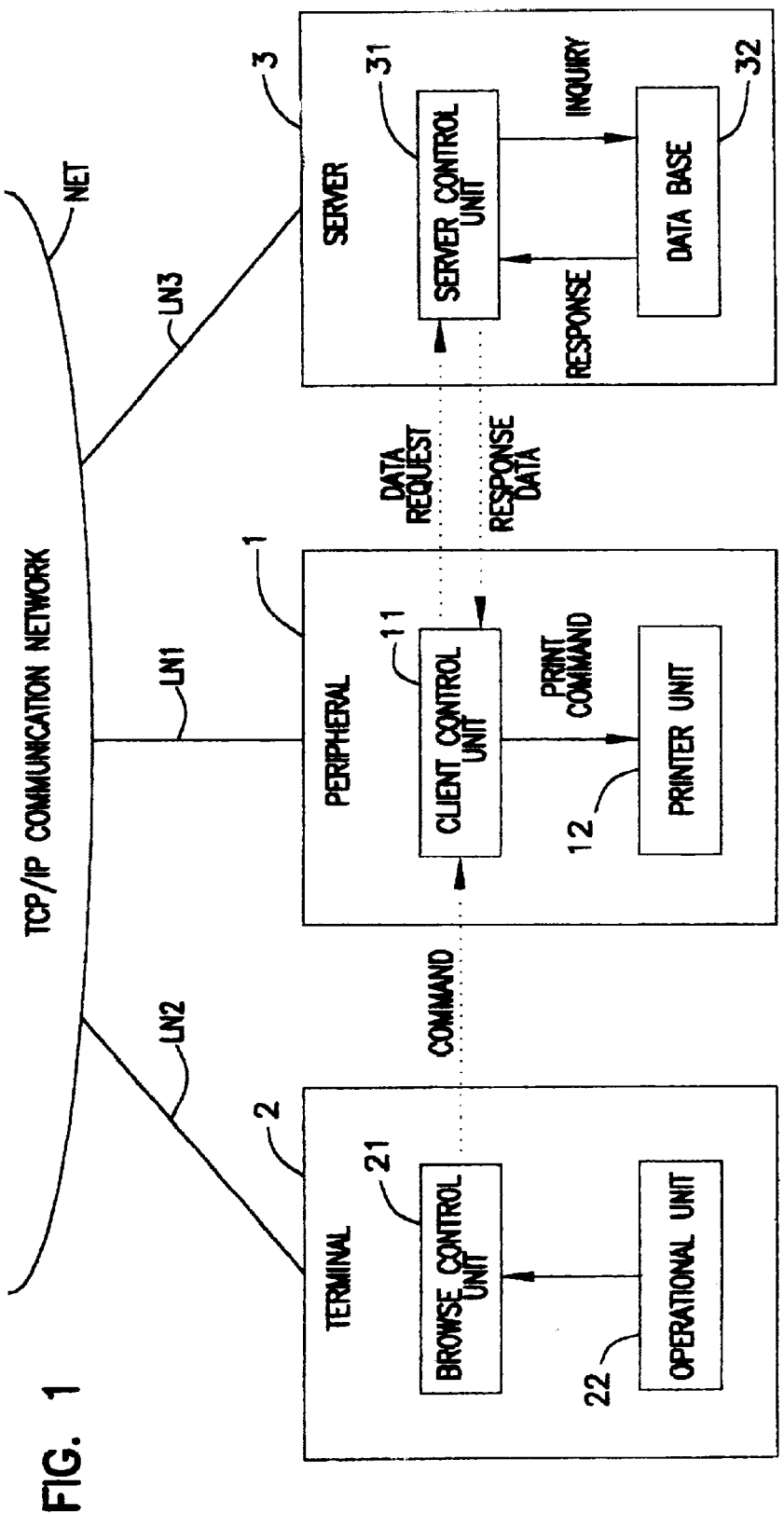
FIG. 1 is a diagram illustrating one preferred embodiment of the client peripheral device based network resource management system according to the current invention.

Referring now to the drawings, wherein like reference numerals designate corresponding structure throughout the views, and referring in particular to FIG. 1, a diagram illustrates one preferred embodiment of the peripheral device client-based network resource management system according to the current invention. The network resource management system resides in a communication network based upon a protocol such as Transmission Control Protocol (TCP)/Internet Protocol (IP) and includes resources. A first resource or a terminal unit 2, a second resource or a peripheral device 1 and a third resource or a server unit 3 are each connected to the TCP/IP communication network via a communication line LN2, LN1 or LN3. The terminal unit 2 is a terminal device such as a personal computer (PC) through which a network user accesses other resources on a network and further includes a browser unit 21 and an operational unit 22. The browser unit 21 enables access to data which is written in a language such as Hypertext Markup Language (HTML) and is stored at a network address as specified by Uniform Resource Locator (URL) in World Wide Web (WWW). The browser unit 21 functions as a client and transfers the HTML data according to Hypertext Transfer Protocol (HTTP). The browser unit 21 also functions as a client to access the HTML data on WWW and to command a peripheral device to perform a predetermined task. For example, the browser unit 21 commands a printer on a network to print the HTML data from a Web site. The operational unit 22 includes an input device such as a keyboard and an output device such as a display. The server unit 3 is another device such as a file server for serving data from a database and further includes a server control unit 31 and a database unit 32. The database unit 32 is only exemplary and not necessary for the preferred embodiment.

The peripheral device 1 includes a device such as a printer, a facsimile machine, and a copier. The peripheral device 1 further includes at least a client control unit 11 and an output unit such as a printer unit 12. Although the peripheral device 1 will be primarily depicted as a client with respect to the server unit 3, the client control unit 11 also functions as a server with respect to the terminal unit 2. The terminal unit 2 as a client requests the peripheral device 1 to function as a server to perform a predetermined task. Since the server function per se of the peripheral device 1 is prior art, the corresponding depiction for the client control unit 11 is eliminated. The printer unit 12 is only exemplary and not necessary for the preferred embodiment.

Still referring to FIG. 1, the operation of the preferred embodiment according to the current invention includes a terminal access to the peripheral device 1 and a client access to the server unit 3 by the peripheral device 1. The terminal unit 2 accesses the peripheral unit 1 via the TCP/IP communication network according a print command to print a Web document on a Web printer. In response to the command, the client control unit 11 of the peripheral device 1 determines whether or not the data to be printed is locally available. Upon determining that the data is not available, the client control unit 11 generates a data request command which specifies a particular data file and a specific network address and broadcast it in the network. The server unit 3 receives the data request command, and the server control unit 31 inquires into the database unit 32 whether the specified file exists. The database unit 32 responds to the server control unit 31 with the request file data, and the server control unit 31 returns the requested file data to the client control unit 11 in the peripheral device 11. Lastly, the client control unit 11 generates an appropriate print command based upon the received file data and sends the command and the data to the printer unit 12.

Figure 2:
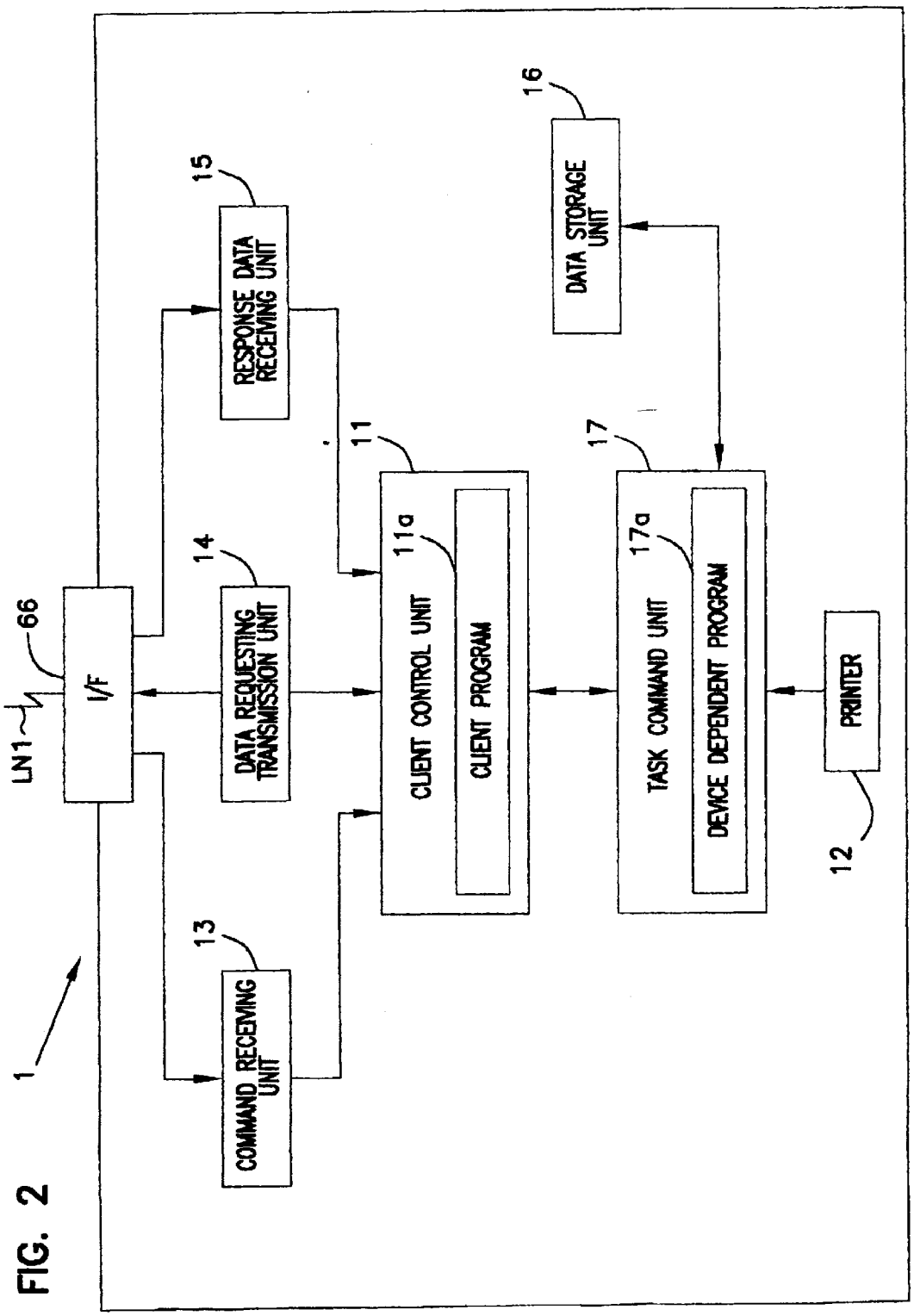
FIG. 2 is a detailed diagram illustrating components of the peripheral device of the preferred embodiment according to the current invention.

Now referring to FIG. 2, the above described peripheral device 1 further includes an interface (I/F) unit 18, a command receiving unit 13, a data request transmission unit 14, a response data receiving unit 15, a data storage unit 16, and a task command unit 17. The client control unit 11 further includes a client software program 11a which includes instructions for the above described client control operations. The action command control unit 17 further includes a software program 17a which includes device dependent instructions for the printer unit 12. The command receiving unit 13 receives a command via the I/F unit 66 and sends it to the client control unit 11. The command specifies the peripheral device 1 to act as a client to retrieve certain data on the network and to print the retrieved data. The client control unit 11 generates a specific data request command. The data request transmission unit 18 receives the data request command from the client control unit 11 and broadcasts the data request command via the I/F unit 18. The response data receiving unit 15 receives response data retrieved from a server via the I/F unit 18 and sends it to the client control unit 11. The client control unit 11 formats the response data in a suitable format for printing based upon the response data type, and the data storage unit 16 stores the appropriately formatted response data prior to printing. The task command unit 17 coordinates a printing process of the response data when the printer unit 12 is already in use. The task command unit 17 retrieves the response data from the data storage unit 16 and sends it to the printer unit 12 when the printer unit is available.

Referring to FIG. 3, one exemplary command is illustrated to describe minimal information for Web printing in one preferred embodiment of the client peripheral device-based network resource management system according to the current invention. The exemplary command is issued from a terminal unit and includes a print command PRT for printing a file and three HTTP parameters. CURL indicates a client address as specified by a first URL for locating a peripheral device which functions as a client. SURL indicates a server address as specified by a second URL for locating a server device which functions as a server. TRM indicates an originator address as specified by a third URL for locating a terminal unit which issued the command.

Referring to FIG. 4, one exemplary content of a memory unit in a peripheral device of one preferred embodiment according to the current invention. According to this example, the memory unit stores information in a table format, and the information includes Server Info, Peripheral Info, Print Status and Response Data. SURL 1 through SURLN each indicate a server address as specified by a URL for locating a server device while TERM1 through TERMN each indicate a terminal address as a URL for locating a terminal. For each entry which is a pair of a server and a terminal, its print status STAS1 through STATN as well as the response data RES1 through RESN to be printed are also stored. According to this example, the response data RES1 which is retrieved from the server SURL1 is already printed as indicated by STAT1. On the other hand, the server SURL2 has not returned response data as indicated by a line, and its print status STAT2 indicates waiting.

Figure 5:
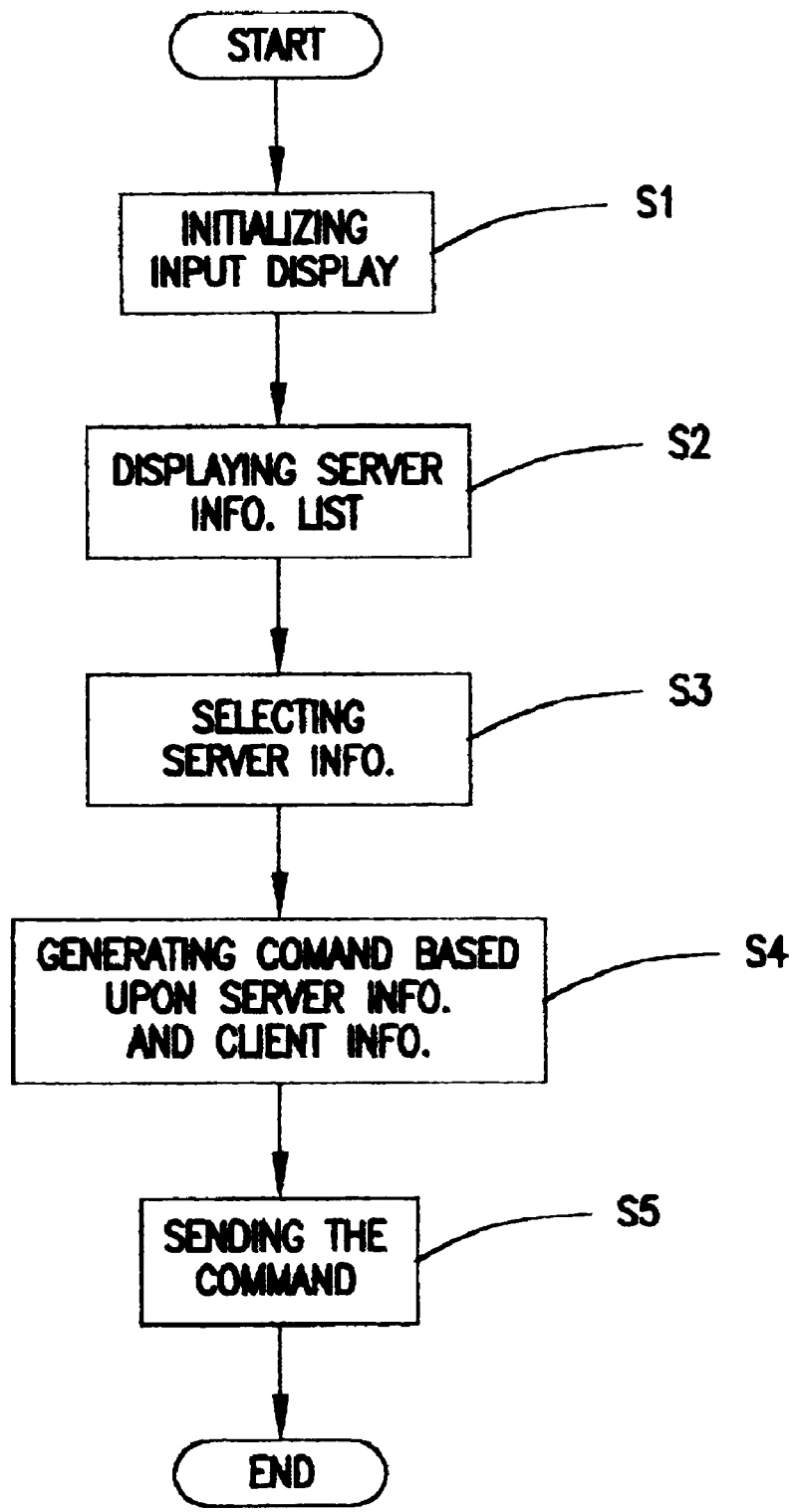
FIG. 5 is a flow chart for illustrating steps involved in one preferred process of managing a resource based upon a client peripheral device according to the current invention.

Referring to FIG. 5, a flow chart illustrates steps involved in one preferred process of managing a resource based upon a peripheral device according to the current invention. In a step S1, an input screen is initialized for inputting client and server information. In a step S2, the input screen displays a list of peripheral devices, a list of files to be printed and associated servers where the files reside. In a step S3, a desirable file to be printed is selected from the list or alternatively is typed in. At the same time, In a step S4, based upon the selected client and server information, a command is generated. For example, the generated command specifies which file is to be printed, from which server the specified file is retrieved and which printer is to be used. In a step S5, the command is executed. The above described steps generally take place in a terminal unit.

Figure 6A:
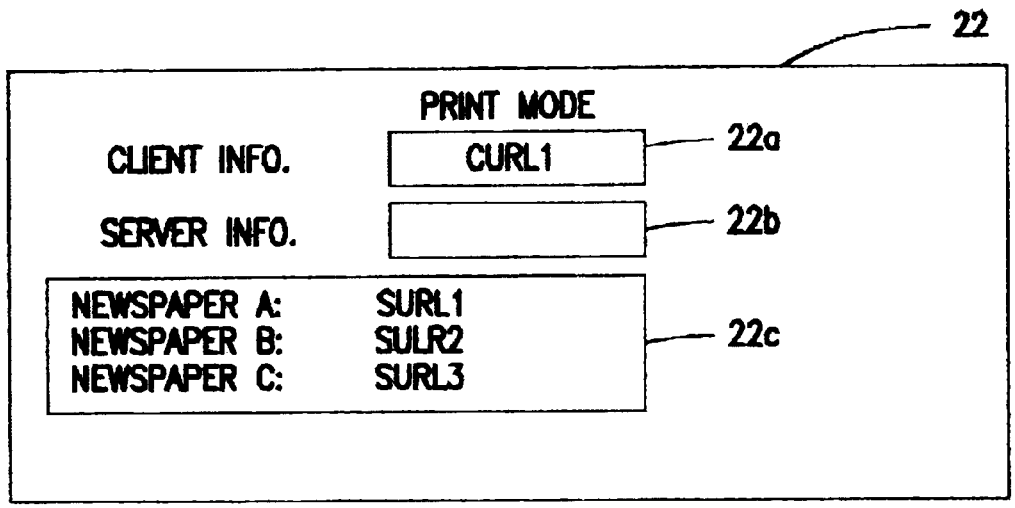
FIGS. 6A and 6B illustrate exemplary screen displays for inputting information for the client peripheral device based resource management system according to the current invention.
Figure 6B:
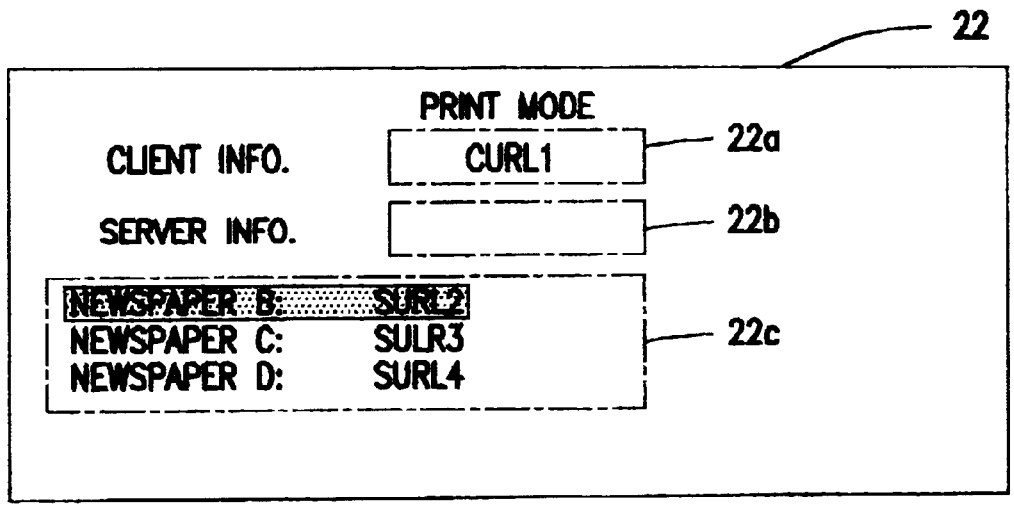

To further illustrate the above described steps of the preferred process according to the current invention, FIG. 6A shows an exemplary initial screen 27 for inputting information for printing a file such as a HTML file at a Web site at a client peripheral device. In this example, the client information is already filled in a client information area 22a. The client information may be typed in or a predetermined. To assist selecting a server from which a web file is retrieved, a list of three servers and associated descriptions is displayed in a list area 22c. In this example, the names of three newspapers and associated server URL are listed for selection. When newspaper B is selected in the list area 22c of the screen 22 as shown in FIG. 6B, the associated server address SURL2 now appears in a server information area 22b.

Figure 7:
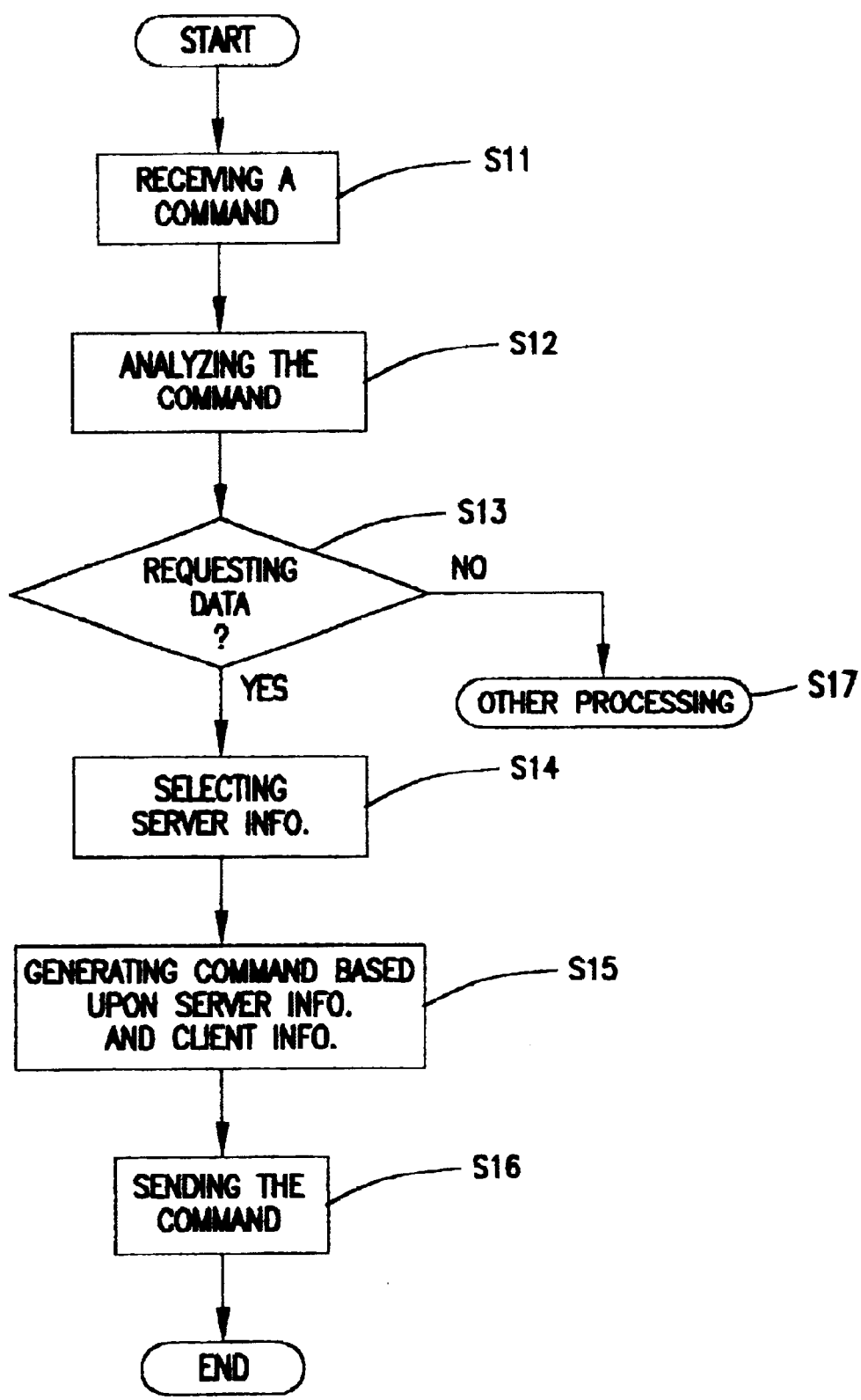
FIG. 7 is a flow chart illustrating steps involved in one preferred process of managing a resource based upon a client peripheral device according to the current invention.

Now referring to FIG. 7, a flow chart illustrates steps involved in one preferred process of managing a resource based upon a peripheral device according to the current invention. In a step S11, the above described command is received while the received command is analyzed in a step S12. After the command is parsed in the step S12, it is determined in a step S13 whether or not the command calls for a data request. Other processing tasks are performed in a step S17 for the command that does not require a data request. On the other hand, if the command requires a data request, in a step S14, the data request is sent to a server so as to retrieve data specified in the command. The command transmission is repeated for a predetermined number of times if the server is busy or not ready to receive the command. In a step S15, the requested data or response data is received and then temporarily stored prior to printing. Finally, the response data is appropriately printed in a step S16. If the printing process is not available for the stored data, the step S16 waits and the temporarily stored response data is not discarded until the printing process is available. In the above described data transfer, it is possible to use not only hypertext transfer protocol (HTTP), but also file transfer protocol (FTP) and simple mail transfer protocol (SMTP). Under the HTTP, documents are in HTML, PDF, DVI, plain text and postscript. In a first alternative process according to the current invention, prior to the printing step S16, the response data is displayed for previewing. In a second alternative process according to the current invention, in lieu of the printing step S16, the response data is used to update certain data such as a client control software program which is generally device dependent. In a third alternative process according to the current invention, in lieu of the printing step S16, the data is faxed.

In summary, the above described steps are generally performed in a peripheral device which functions as a client to manage resources in a network. In general, a peripheral device client acts independently after receiving a command and actively seeks a resource such as a file server on a network. Lastly, the peripheral device client performs a predetermined device dependent task such as printing on data retrieved from another resource. The client peripheral device allows a user to issue a command at a terminal unit without further human intervention. The client peripheral device monitors its tasks and tries a predetermined number of times if they are not completed.

Figure 8:
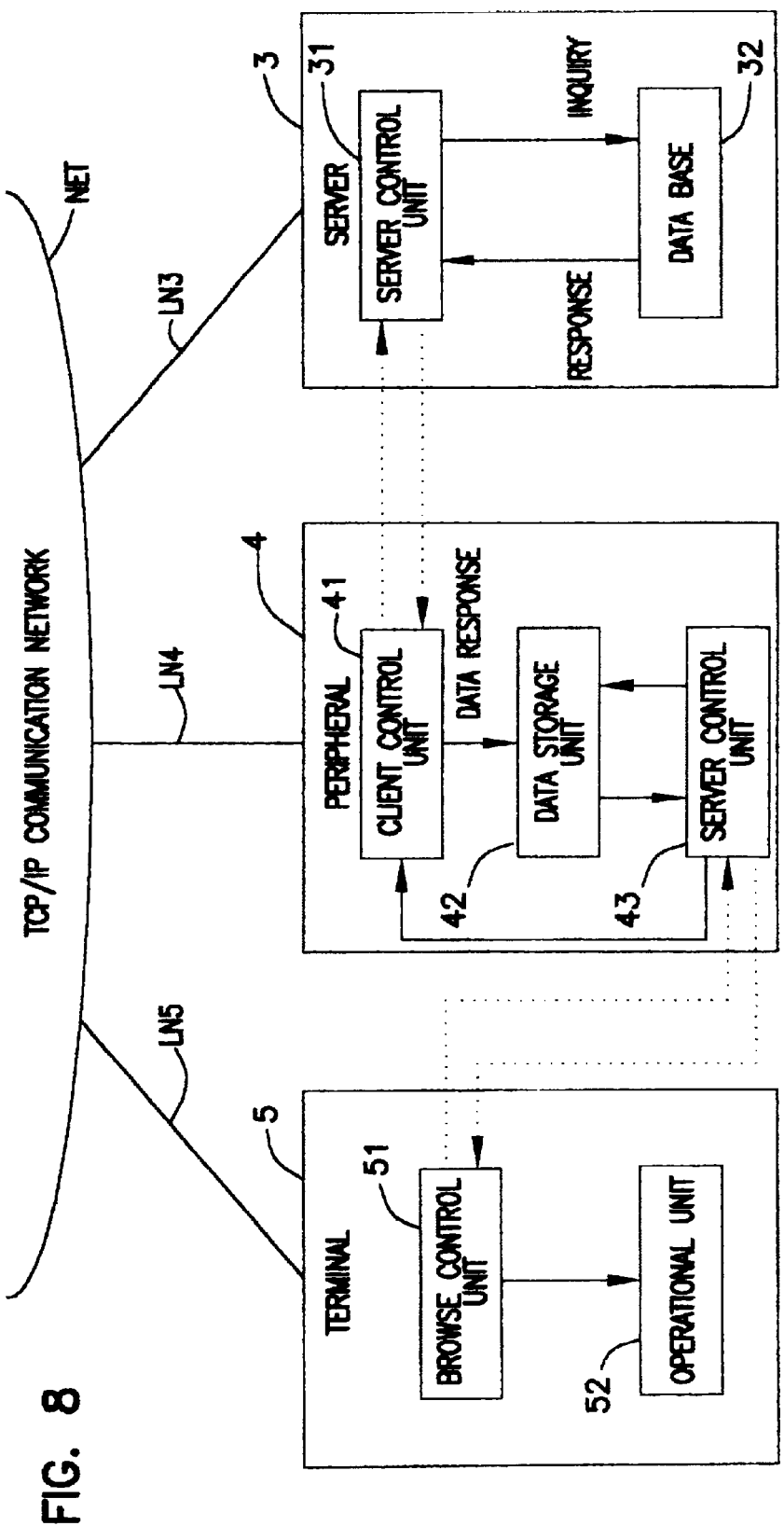
FIG. 8 is a diagram illustrating a second preferred embodiment of the client peripheral device based network resource management system according to the current invention.

Referring to FIG. 8, a diagram illustrates a second preferred embodiment of the client peripheral device based network resource management system according to the current invention. The network resource management system resides in a communication network based upon a protocol such as Transmission Control Protocol (TCP)/ Internet Protocol (IP) and includes resources. A first resource or a terminal unit 5, a second resource or a peripheral device 4 and a third resource or a server unit 3 are each connected to the TCP/IP communication network via a communication line LN5, LN4 or LN3. The terminal unit 5 is a terminal device such as a personal computer (PC) through which a network user accesses other resources on a network and further includes a browser unit 51 and an operational unit 52. The browser unit 51 enables access to data which is written in a language such as HTML and is stored at a network address as specified by URL in WWW. The browser unit 51 functions as a client and transfers the HTML data according to HTTP. The browser unit 51 also functions as a client to access the HTML data on WWW and to command a peripheral device to perform a predetermined task. The operational unit 52 includes an input device such as a keyboard and an output device such as a display. The server unit 3 is another device such as a file server for serving data from a database and further includes a server control unit 31 and a database unit 32. The database unit 32 is only exemplary and not necessary for the preferred embodiment.

Still referring to FIG. 8, the peripheral device 4 includes at least a client control unit 41, a data memory unit 42 and a server control unit 43. The peripheral device 4 additionally may include other components and is a device-dependent machine such a printer, a copier, a facsimile machine, or a combination thereof. The client control unit 41 sends a data request to a server 3 on a predetermined frequency or on demand. Upon receiving the data request, a server control unit 31 of the server 3 sends an inquiry to a database 32, and the database 32 returns the response data to the server control unit 31. In turn, the server control unit 31 sends the response data back to the client control unit 41 in the peripheral device 4. The response data then updates the information already stored in a data storage unit 42. In the alternative, the response data is new information to be stored in the data storage unit 42. A terminal unit 5 inputs a data request via an operational unit 52 and sends the peripheral device 4 the data request for certain data via a browser 51, and a server control unit 43 in the peripheral device 4 receives the data request. The server control unit 43 then sends an inquiry into the database 42 and receives response data which has been updated or newly stored by the client control unit 41. The server control unit 43 in turn returns the response data back to the browser 51. The above described updated or new information is thus available in the peripheral device 4 even though the update or new information is originally deposited in the server 3 without directly accessing the server 3.

Figure 9:
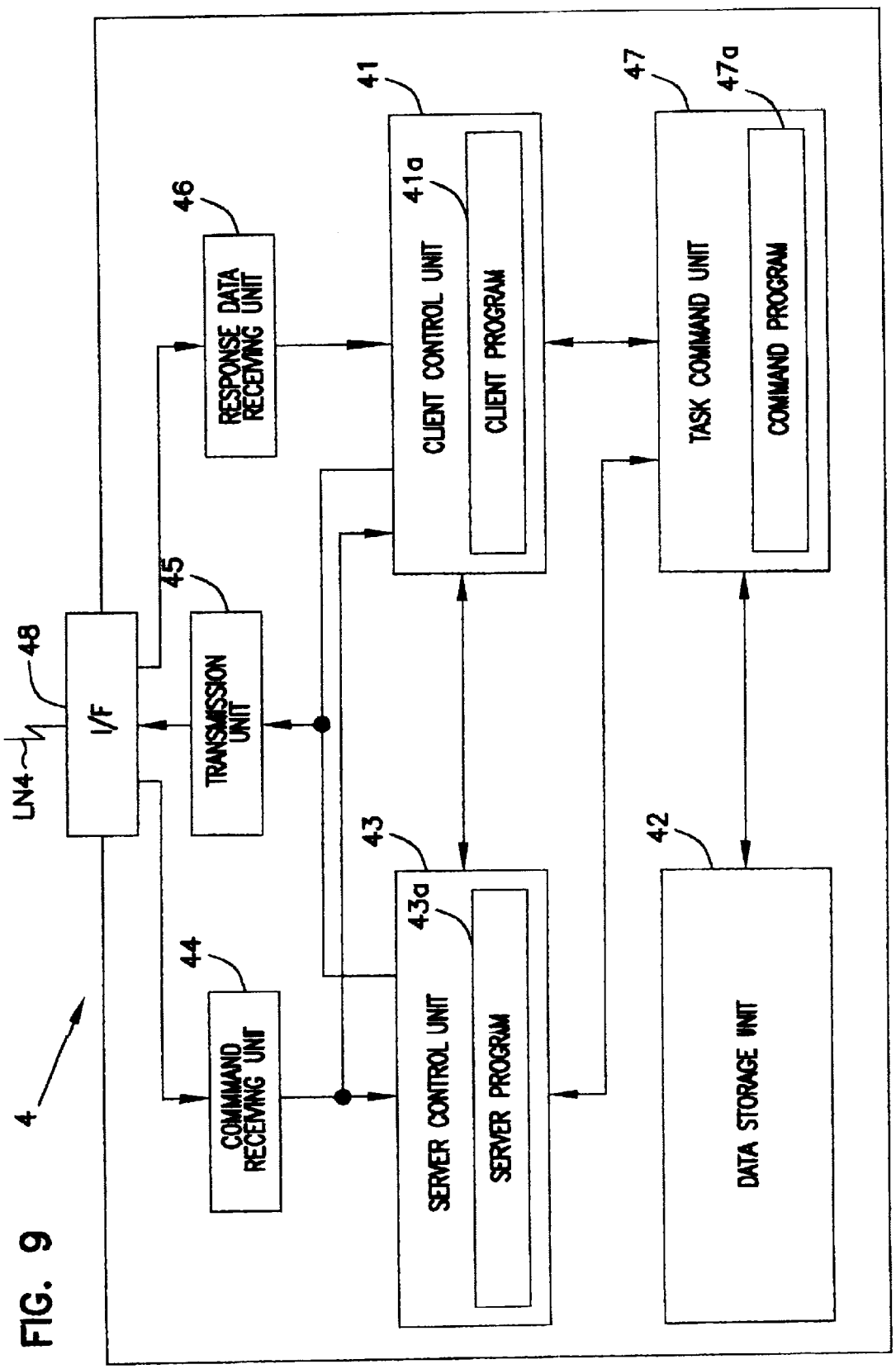
FIG. 9 is a detailed diagram illustrating components of the peripheral device of the second preferred embodiment according to the current invention.

Now referring to FIG. 9, the above described peripheral device 4 further includes an interface (I/F) unit 48, a command receiving unit 44, a transmission unit 45, a response data receiving unit 46, a server control unit 43, a client control unit 41, a data storage unit 42, and a task command unit 47. The client control unit 41 further includes a client software program 41*a* which includes instructions for the above described client control operations. The server control unit 43 further includes a server software program 43*a* which includes instructions for the above described server control operations. The task control unit 47 further includes a software command program 47*a* which includes device dependent instructions. The command receiving unit 44 receives a command via the I/F unit 48 and sends it to the server control unit 43, and the server control 43 in turn accesses the data storage unit 42 via the task command unit 47 for retrieving response data. On the other hand, the client control unit 41 sends a data request via the transmission unit 45 and the I/F unit 48 to retrieve certain data on the network. In response to the data request from the client control unit 41, the response data receiving unit 46 receives the response data via the I/F unit 48 and sends it to the client control unit 41. Lastly, based upon the response data, the client control unit 41 updates information already stored in the data storage unit 42 via the task command unit 47. In the alternative, if no corresponding information is stored in the data storage unit 42, the response data is newly stored in the data storage unit 42 via the task command unit 47.

Figure 10A:
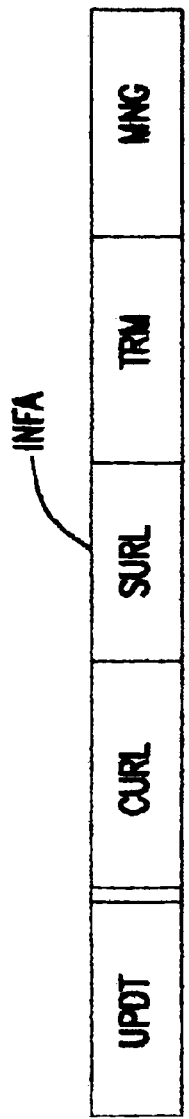
FIGS. 10A and 10B illustrate exemplary commands for retrieving and updating data from a network resource in the second preferred embodiment of the client peripheral device-based network resource management system according to the current invention.
Figure 10B:
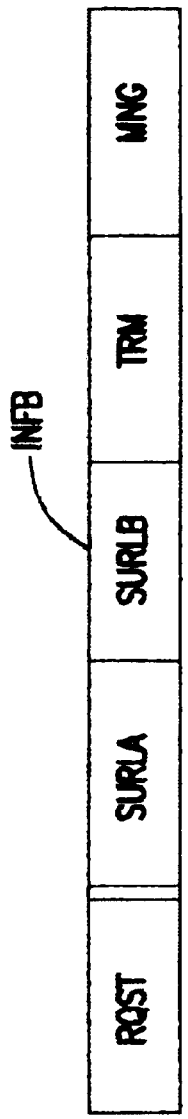

Referring to FIGS. 10A and 10B, exemplary commands with associated parameters are illustrated to further describe the second preferred embodiment of the peripheral device client-based network resource management system according to the current invention. Now referring to FIG. 10A, the exemplary command is an update command UPDT for updating information stored in a data storage unit with new information retrieved from another resource on the network. CURL indicates a client address as specified by a first URL for locating a peripheral device which functions as a client. SURL indicates a server address as specified by a second URL for locating a server from which the new information is retrieved. TRM indicates an originator address as specified by a third URL for locating a terminal unit which issued the update command. Lastly, data administration information MNG specifies whether or not the data is to be updated. MNG also specifies the update frequency.

Now referring to FIG. 10B, the exemplary command is a data request command RQST for requesting information from another resource on the network. CURL indicates a client address as specified by a first URL for locating a peripheral device which functions as a client. SURL indicates a server address as specified by a second URL for locating a server from which the new information is retrieved. TRM indicates an originator address as specified by a third URL for locating a terminal unit which issued the data request command. Lastly, data administration information MNG specifies whether or not the data is to be requested. MNG also specifies a single data request frequency or a set of multiple data request frequencies.

Referring to FIG. 11, one exemplary content of a memory unit in a peripheral device of the second preferred embodiment according to the current invention. According to this example, the memory unit stores information in a table format, and the information includes Server Info, Client Info, Terminal Info, Update Info, and Schedule Frequency and Response Data. SURL1 through SURLN each indicate a server address as specified by a URL for locating a server device while CURL1 through CURLN each indicate a client address as specified by a URL for locating a client. TERM1 through TERMN each indicate a terminal address as indicated by a URL for locating a terminal. Update indicates whether or not each entry requires updating. For each necessary update, a schedule update time is noted in parentheses. In this example, the information is updated once a day at 10:00 AM at CURL1 from SURL1. Lastly, the response data RES1 through RESN is attached in the table.

Figure 12:
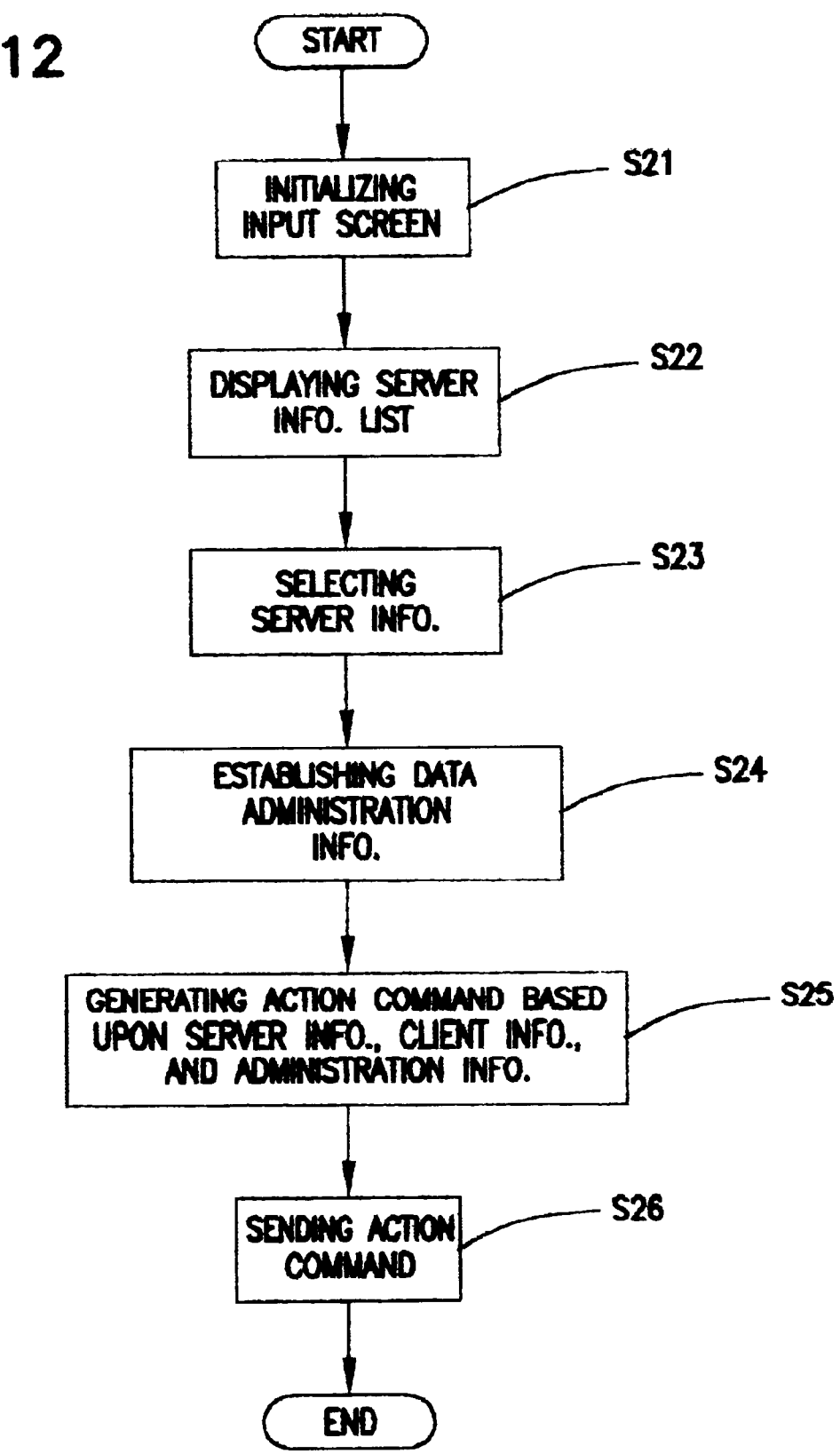
FIG. 12 is a flow chart for illustrating steps involved in one preferred process of managing a resource based upon a client peripheral device according to the current invention.

Now referring to FIG. 12, a flow chart illustrates steps involved in a second preferred process of managing a resource based upon a peripheral device according to the current invention. In a step S21, an input screen is initialized for inputting client and server information. In a step S22, the input screen displays a list of servers where a file to be updated resides. In a step S23, a desirable server is selected from the list or alternatively is typed in. In a step S24, data administration information is established, and in a step S25, an action command is generated based upon the above selected server info, client info and data administration info. In a step S26, the command is executed. The above described steps generally take place in a terminal unit.

Figure 13A:
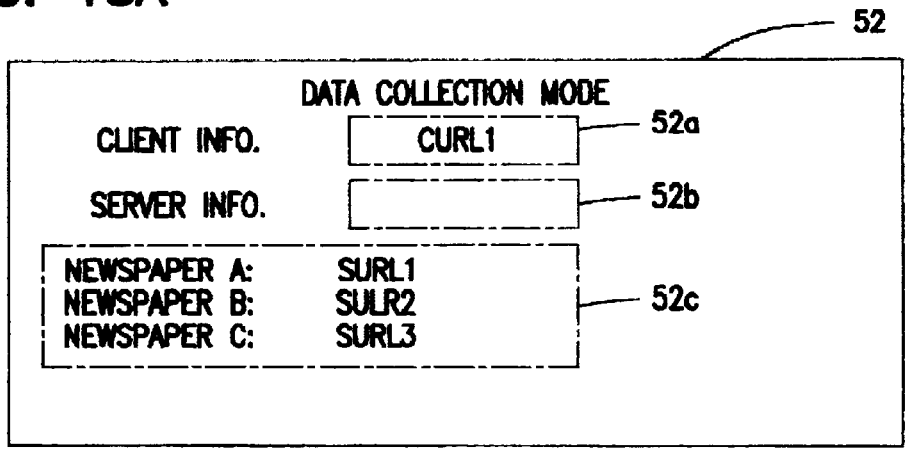
FIGS. 13A, 13B and 13C illustrate exemplary screen displays for inputting information for the client peripheral device based resource management system according to the current invention.
Figure 13B:
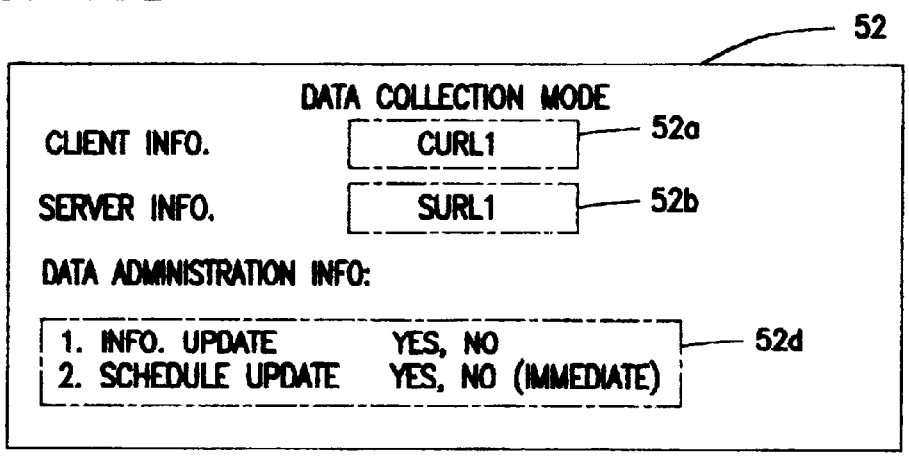
Figure 13C:
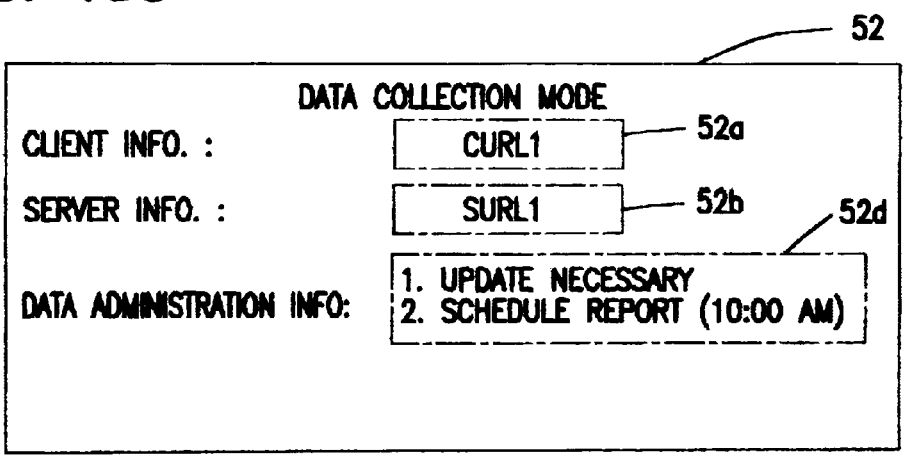

To further illustrate the above described steps of the preferred process according to the current invention, FIG. 13A shows an exemplary screen 52 for inputting information for retrieving data or information such as a HTML file from a Web site. In this example, the client information is already filled in a client information area 52a. The client information may be typed in or a predetermined. To assist selecting a server from which a web file is retrieved, a list of three servers and associated descriptions is displayed in a list area 52c. In this example, the names of three newspapers and associated server URL are listed for selection. When newspaper A is selected as shown in FIG. 13B, the associated server address SURL1 now appears in a server information area 52b. FIG. 13B also shows a list of items under data administration Info area 52d. For updating, a choice between yes and no is shown. For update schedule, a choice among yes, no and immediate is also shown. Lastly, FIG. 13C illustrates a complete set of selected information in the screen 52. The data administration information indicates that the information update is necessary and is scheduled at 10:00 AM.

Figure 14:
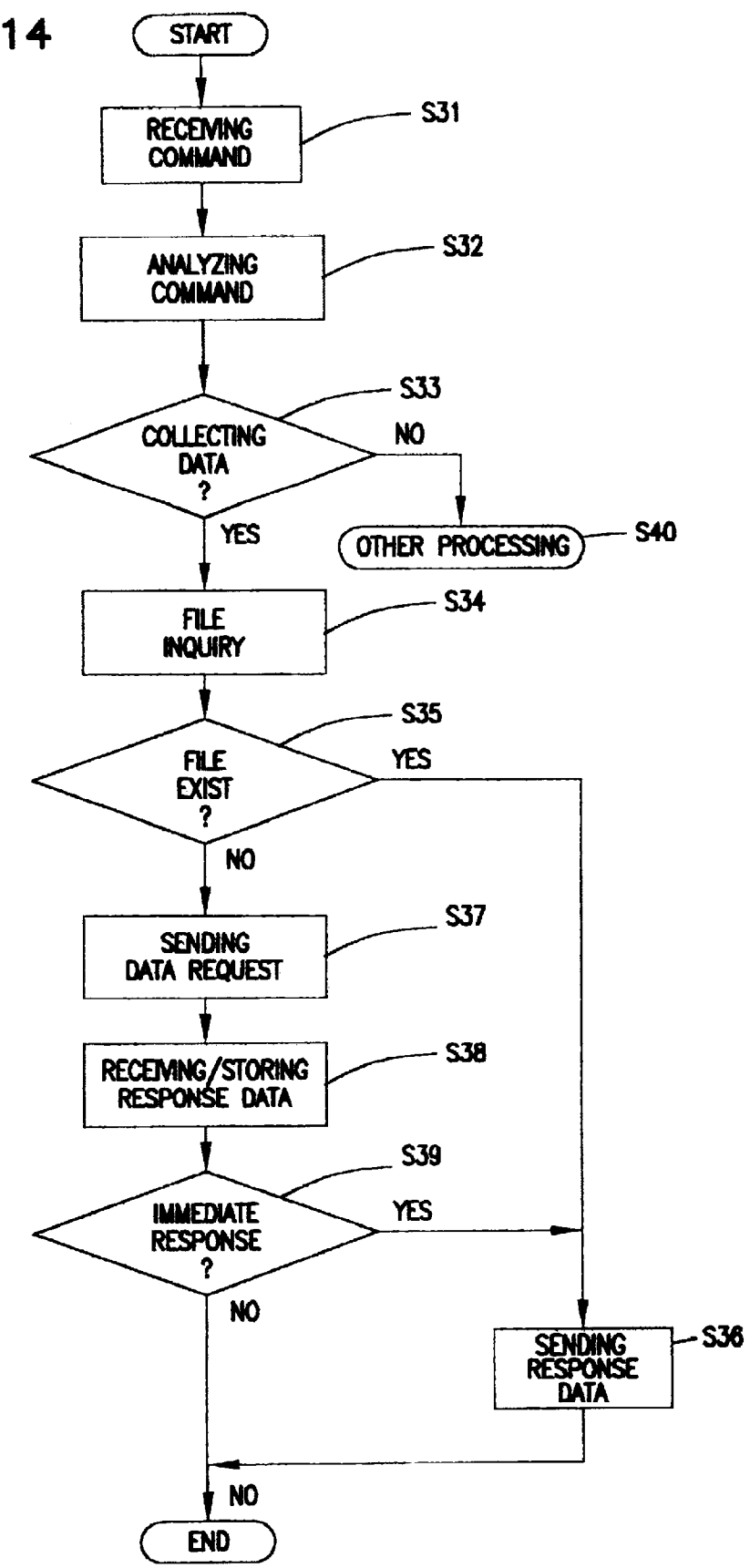
FIG. 14 is a flow chart illustrating steps involved in one preferred process of managing a resource based upon a peripheral device according to the current invention.

Now referring to FIG. 14, a flow chart illustrates steps involved in one preferred process of managing a resource based upon a peripheral device according to the current invention. In a step S31, the above described command is received while the received command is analyzed in a step S32. After the command is parsed in the step S32, it is determined in a step S33 whether or not the command calls for a data request or data collection. Other processing tasks are performed in a step S40 for the command that does not require a data request. On the other hand, if the command requires a data request, in a step S34, the specified data is sought within the resource in a step S35. That is, the file is searched in a memory storage unit in the peripheral device. If the file is found with in the same resource, the file is transmitted to an original requester in a step S36. If the file does not exist within the same resource, the data request is sent to a server so as to retrieve data specified in the command in a step S37. The command transmission is repeated for a predetermined number of times if the server is busy or not ready to receive the command. In a step S38, the requested data or response data is received and then temporarily stored. In a step S39, it is determined whether or not a response is immediate. If an immediate response is necessary, the response data is returned to an originator in a step S36. On the other hand, if no immediate response is necessary, the response data is not returned.

Figure 15:
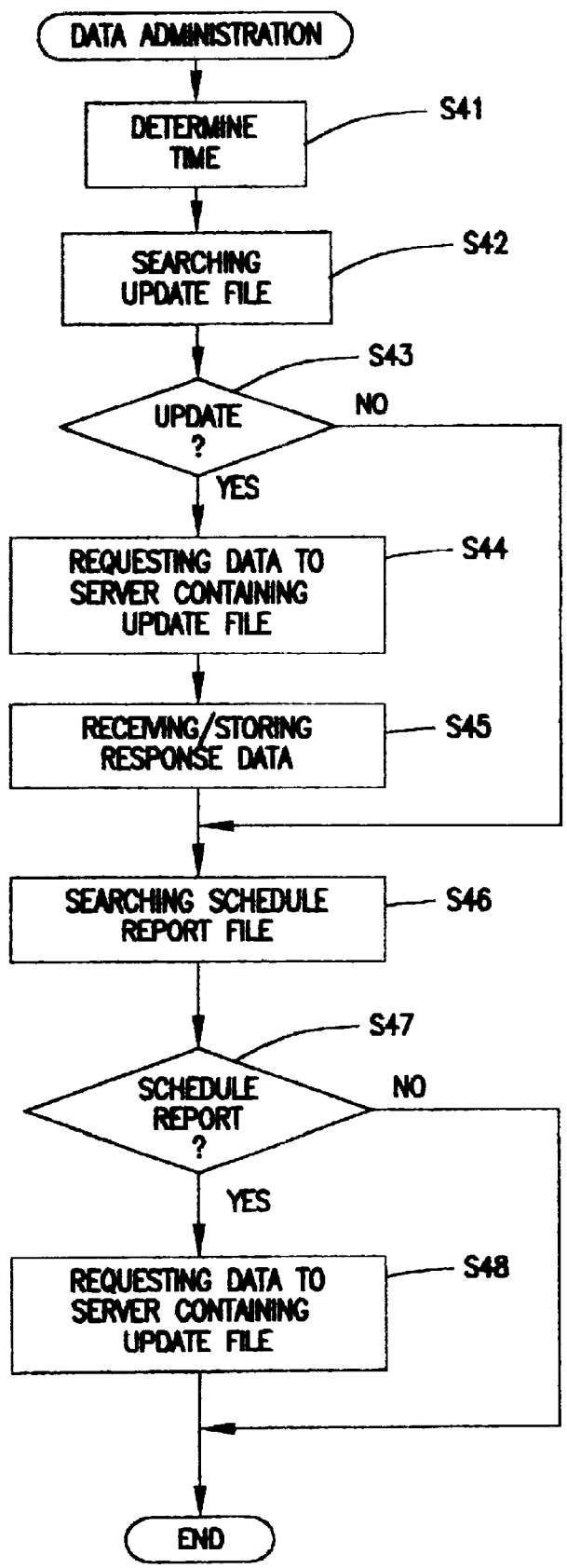
FIG. 15 is a flow chart illustrating steps involved in another preferred process of managing a resource based upon a peripheral device according to the current invention.

Referring to FIG. 15, a flow chart illustrates steps involved in another preferred process of managing a resource based upon a peripheral device according to the current invention. In a step S41, current time is examined in reference to a predetermined schedule time for updating information. In a step 42, a file is searched for mandatory updating. If it is determined that no file exists for mandatory updating in a step S43, the process proceeds to a step S46. On the other hand, if it is determined in the step S43, a file exists for mandatory updating. In a step S44, a data request is sent to an appropriate server, and the response data is returned and used to update the mandatory updating file in a step S45. In a step S46, it is determined whether or not files are scheduled for update. If it is determined in a step S47 that no file is scheduled for regular update, the process ends. On the other hand, if a file exists for regular update in the step S47, response data is sent to an original terminal unit in a step S48.

Figure 16:
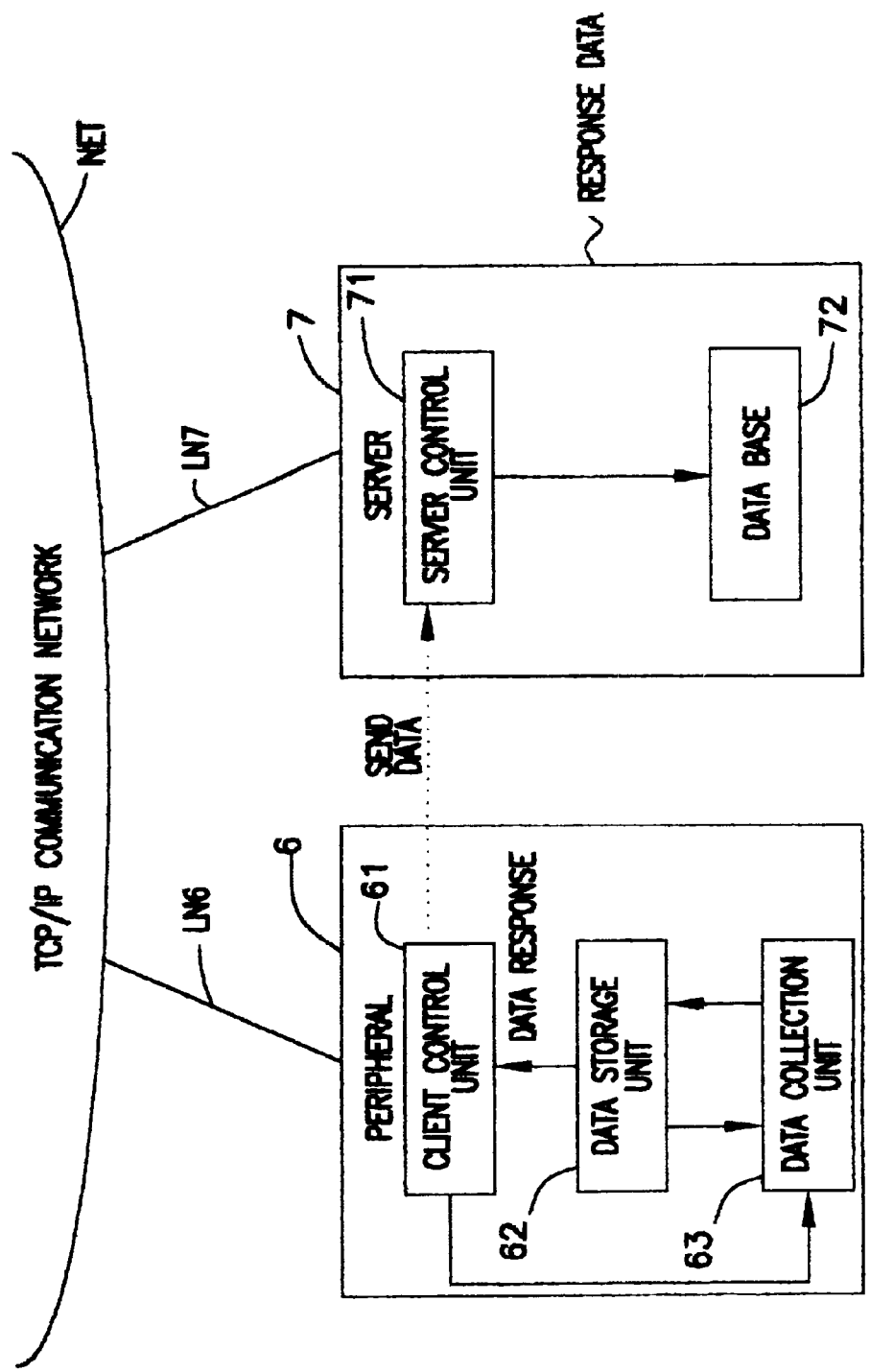
FIG. 16 is a diagram illustrating a third preferred embodiment of the peripheral device client-based network resource management system according to the current invention.

Referring to FIG. 16, a diagram illustrates a third preferred embodiment of the peripheral device client-based network resource management system according to the current invention. The network resource management system resides in a communication network based upon a protocol such as Transmission Control Protocol (TCP)/ Internet Protocol (IP) and includes resources. A first resource or a peripheral device 6 and a second resource or a server unit 7 are each connected to the TCP/IP communication network via a communication line LN6 or LN7. The peripheral device further includes a client control unit 61, a data storage unit 62 and a data collection unit 63. The server unit 7 further includes a server unit 71 and a database unit 72. One example of the peripheral device 6 is an image capturing device, and image data is collected in the data collection unit 63. The data is stored in the data storage unit 62 before the client control unit 61 sends the data to a predetermined server such as the server 7. In effect, the client control unit 61 updates a server file in the database unit 72. The update is caused on demand by a user, a predetermined event such as a new input image capture and or a regularly schedule time.

Figure 17:
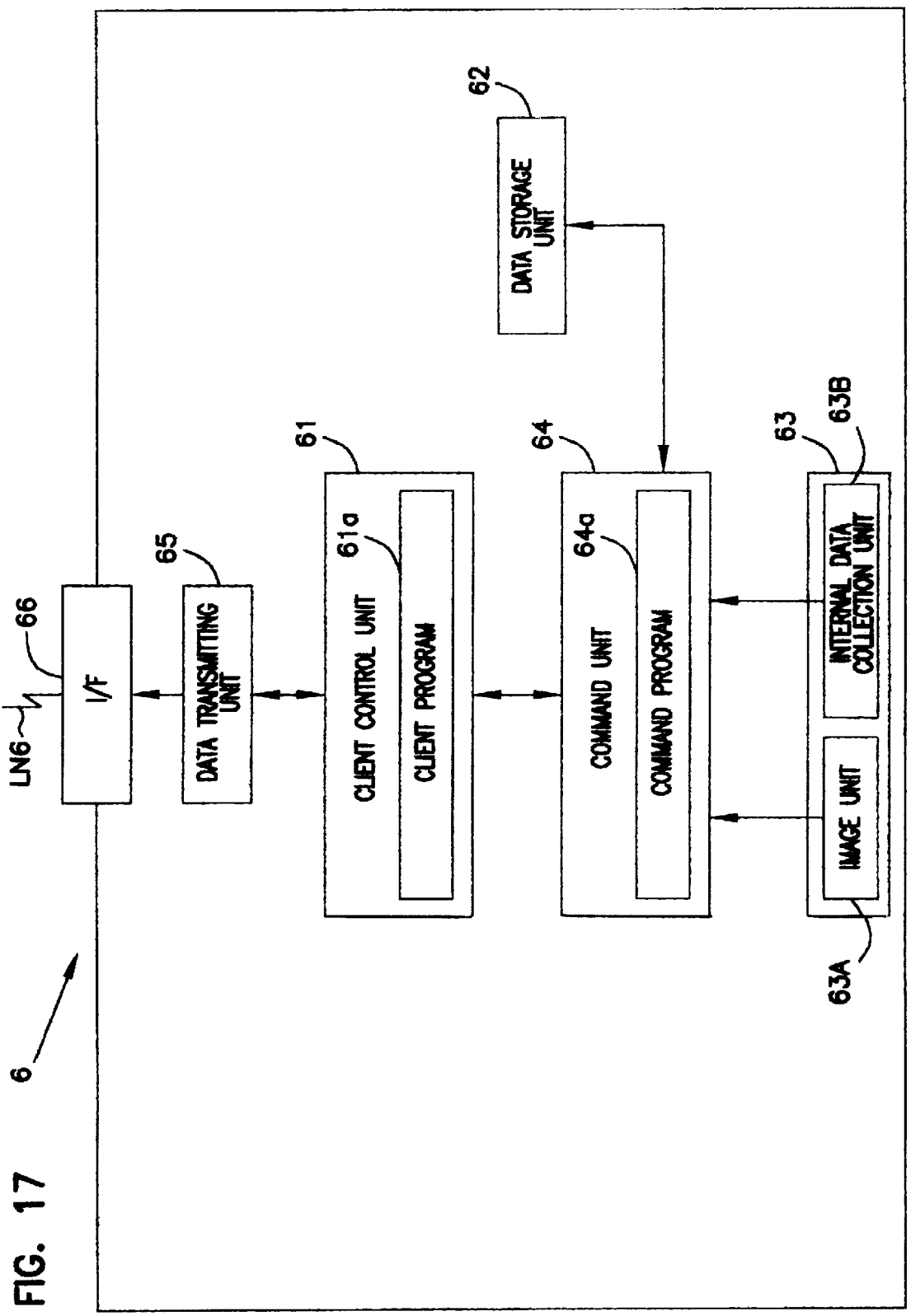
FIG. 17 is a detailed diagram illustrating components of the peripheral device of the third preferred embodiment according to the current invention.

Now referring to FIG. 17, the above described peripheral device 6 further includes an interface (I/F) unit 66, a data request transmission unit 65, a client control unit 61, a data storage unit 62, a data collection unit 63 and a task command unit 64. The client control unit 61 further includes a client software program 61a which includes instructions for the above described client control operations. The action command control unit 64 further includes a software program 64a which includes device dependent instructions for the data collection unit 63. The data collection unit 63 further includes an image input unit 63A and an internal data collection unit 63B. While the image input unit 63A captures an image, the internal data collection unit 63B collects internal data related to the capturing of the image. For example, internal error codes and log information are collected as internal data. Both the internal data and image data are stored in the data storage unit 62 via the command unit 64. The client control unit 61 generates a specific data update command and attaches the update data from the data storage unit 62. The data transmission unit 65 receives the data update command from the client control unit 61 and broadcasts the data update command along with the update data via the I/F unit 66.

Referring to FIG. 18, one exemplary command is illustrated to describe minimal information for Web updating in the third preferred embodiment of the peripheral device client-based network resource management system according to the current invention. The exemplary command is issued by a peripheral device for updating a file. CLSS indicates a class or type of image data. SURL indicates a server address as specified by an URL for locating a server device which functions as a server. DT indicates data used for updating.

Referring to FIG. 19, one exemplary content of a memory unit in a peripheral device of a third preferred embodiment according to the current invention. According to this example, the memory unit stores information in a table format, and the information table 62 includes Data Type, Server Info, Schedule Update/Report and Data Collection. Data Type includes a type such as CMR and DTC. SURL1 through SURLN each indicate a server address as specified by a URL for locating a server device. Although Schedule Update is specified by its frequency in this example and includes ever hour and every three hours, the frequency can be specified by a time. Lastly, the collection data is indicated by CMDT and DTDT.

Figure 20:
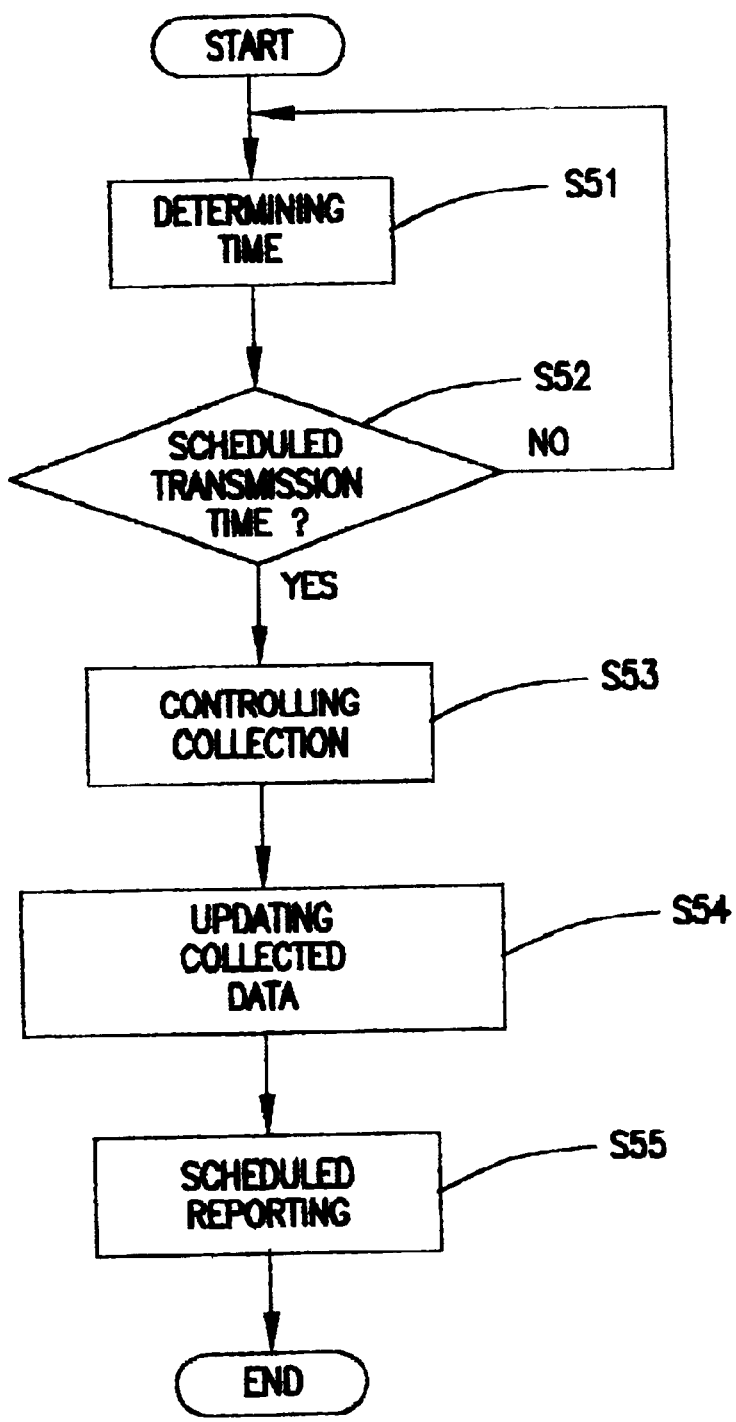
FIG. 20 is a flow chart for illustrating steps involved in one preferred process of managing a resource based upon a client peripheral device according to the current invention.

Referring to FIG. 20, a flow chart illustrates steps involved in another preferred process of managing a resource based upon a peripheral device according to the current invention. In a step S51, current time is examined in reference to a predetermined schedule time for updating information. In a step 52, a file is searched for scheduled updating. If it is determined that no file exists for scheduled updating in a step S52, the process proceeds to the step S51. On the other hand, if it is determined in the step S52, a file exists for scheduled updating. In a step S53, data is inputted. For example, if the peripheral device includes an image capturing device, a new image is captured in a predetermined manner. The newly collected data is stored, and if previously stored data exists, the newly collected data replaces the old data in a step S54. After storing the data, if a scheduled update is due, in a step S55, the newly collected data is sent to a predetermined server to update the corresponding data stored therein.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the term in which the appended claims are expressed.

What is claimed is:

1. A method of using a resource on a network, a first resource, a second resource, and a printer being connected to the network, comprising the steps of:
   a) sending a print command and a data file name of a data file from the first resource to the printer for printing data specified in the print command;
   b) receiving the print command and the data file name at the printer;
   c) determining by the printer whether or not the data file is available to the printer;
   d) generating a data search command at the printer in response to the print command based upon said step c) and sending the data search command to the second resource for requesting the data;
   e) receiving the data at the printer from the second resource; and
   f) printing the data from the printer.

2. The method of using a resource on a network according to claim 1 wherein said second resource is a database server.

3. The method of using a resource on a network according to claim 1 further comprising an additional step g) between said steps d) and e) of storing the data received in said step d).

4. The method of using a resource on a network according to claim 1 wherein the network is World Wide Web.

5. A method of using a peripheral device on a network, comprising the steps of:
   a) automatically initiating a client task at the peripheral device so as to send a data request command and a data file name of a data file;
   b) generating at the peripheral device a specific request command based upon the data request command and the data file name;
   c) broadcasting from the peripheral device the specific request command to a server in the network for requesting the data;
   d) receiving at the peripheral device data requested in said step c) from the server; and
   e) performing a predetermined task at the peripheral device based upon the data.

6. The method of using a peripheral device on a network according to claim 5 wherein said step d) further comprising an additional step f) of storing the received data.

7. The method of using a peripheral device on a network according to claim 6 wherein said step f) updates the received data which has been previously stored.

8. The method of using a peripheral device on a network according to claim 5 wherein said predetermined task is performed via device specific instructions.

9. The method of using a peripheral device on a network according to claim 5 wherein said predetermined task includes printing, copying, faxing and displaying.

10. The method of using a peripheral device on a network according to claim 5 further comprising an additional step g) of reporting a receipt of the data request command to a sender of the data request command.

11. The method of using a peripheral device on a network according to claim 5 wherein said predetermined task is programmable.

12. The method of using a peripheral device on a network according to claim 5 wherein the network is World Wide Web.

13. A system for using a resource on a network, comprising:
   a first resource on the network for sending a print command and a data file name of a data file for printing data;
   a printer on the network for receiving the print command and the data file name, determining whether or not the data file is available to said printer, generating a second command requesting the data file in response to the print command, and sending the second command; and
   a third resource on the network for sending the data file to the printer in response to the second command, wherein said printer generates a data search command upon failing to receive the data file, said printer printing the data file according to the print command upon receiving the data file.

14. The system for using a resource on a network according to claim 13 wherein said third resource includes a database server.

15. The system for using a resource on a network according to claim 13 wherein said printer stores the additional data.

16. The system for using a resource on a network according to claim 13 wherein said first resource, said printer and said third resource are on World Wide Web.

17. A system for using a resource on a network, comprising:
   a terminal unit on the network for broadcasting a data request command and a data file name of a data file;
   a client peripheral device on the network for performing a predetermined task and for generating a specific request command based upon the data request command and the data file name, said client peripheral device automatically initiating a client task and broadcasting the specific request command; and a server unit on the network for sending response data to said client peripheral device in response to the specific request command, wherein said client peripheral device performs the predetermined task on the response data from said server.

18. The system for using a resource on a network according to claim 17 wherein said client peripheral device further comprises a storage unit for storing the received data.

19. The system for using a resource on a network according to claim 18 wherein said storage unit replaces the received data which has been previously stored.

20. The system for using a resource on a network according to claim 17 wherein said client peripheral device further comprises a command request unit for broadcasting the specific request command on the network.

21. The system for using a resource on a network according to claim 17 wherein said client peripheral device performs a predetermined task based upon device specific instructions.

22. The system for using a resource on a network according to claim 17 wherein said client peripheral device includes a printer, a copier, a facsimile machine and a display.

23. The system for using a resource on a network according to claim 17 wherein said client peripheral device acknowledges a receipt of the data request to said terminal unit.

24. The system for using a resource on a network according to claim 17 wherein said client peripheral device further comprises a programmable memory unit for storing a program for performing the predetermined task.

25. The system for using a resource on a network according to claim 17 wherein said terminal unit, said client peripheral device and said server unit are located on World Wide Web.

* * * * *

UNITED STATES PATENT AND TRADEMARK OFFICE
CERTIFICATE OF CORRECTION

PATENT NO.     : 6,330,611 B1                                    Page 1 of 1
DATED          : December 11, 2001
INVENTOR(S)    : Hideki Itoh and Akeo Maruyama It is certified that error appears in the above-identified patent and that said Letters Patent is hereby corrected as shown below:

Column 6,
Line 8, delete "initial" and change "27" to -- 22 --.

Signed and Sealed this

Twenty-fourth Day of September, 2002

*Attest:*

JAMES E. ROGAN
*Attesting Officer*                    *Director of the United States Patent and Trademark Office*